United States Patent
Veatch et al.

[15] 3,657,015
[45] Apr. 18, 1972

[54] HYDRAZINE FUEL CELL AND PROCESS OF OPERATING SAID FUEL CELL

[72] Inventors: Franklin Veatch, Lyndhurst; Ernest C. Milberger, Maple Heights; Robert D. Presson, Cleveland, all of Ohio

[73] Assignee: The Standard Oil Company, Cleveland, Ohio

[22] Filed: May 2, 1960

[21] Appl. No.: 26,185

[52] U.S. Cl. .................................136/83 R, 136/86 E
[51] Int. Cl. ...........................H01m 27/26, H01m 27/30
[58] Field of Search ..............................................136/86, 83

[56] References Cited

UNITED STATES PATENTS

| | | | |
|---|---|---|---|
| 2,175,523 | 10/1939 | Greger | 136/86 |
| 3,115,427 | 12/1963 | Rightmere | 136/86 |
| 3,163,560 | 12/1964 | Grimes et al. | 136/86 |
| 3,178,315 | 4/1965 | Worsham | 136/86 |
| 2,901,522 | 8/1959 | Bopp | 136/154 |
| 2,913,511 | 11/1959 | Grubb | 136/86 |
| 2,700,063 | 1/1955 | Manecke | 136/153 S |
| 2,925,454 | 2/1960 | Justi et al. | 136/86 |
| 3,012,086 | 12/1961 | Vahldieck | 136/86 |

OTHER PUBLICATIONS

Ephraim– Inorganic Chemistry, 5th Ed., 1948, pages 664, 665
Status Report, 1959, pages 20, 60– 63

*Primary Examiner*—Allen Curtis
*Attorney*—Jerome F. Kramer

EXEMPLARY CLAIM

1. A process for conversion of chemical energy directly into electrical energy which comprises the steps of supplying an aqueous solution of hydrazine to the interface between an anode and an aqueous electrolyte in a fuel cell, supplying an oxidizing agent to the interface between a cathode and an aqueous electrolyte in said fuel cell said anode and cathode being ionically connected, and electrically connecting said anode and cathode through an electrical load.

10 Claims, 5 Drawing Figures

INVENTORS
FRANKLIN VEATCH,
ERNEST C. MILBERGER AND
ROBERT D. PRESSON

BY

*Kramer + Sturges*

ATTORNEYS.

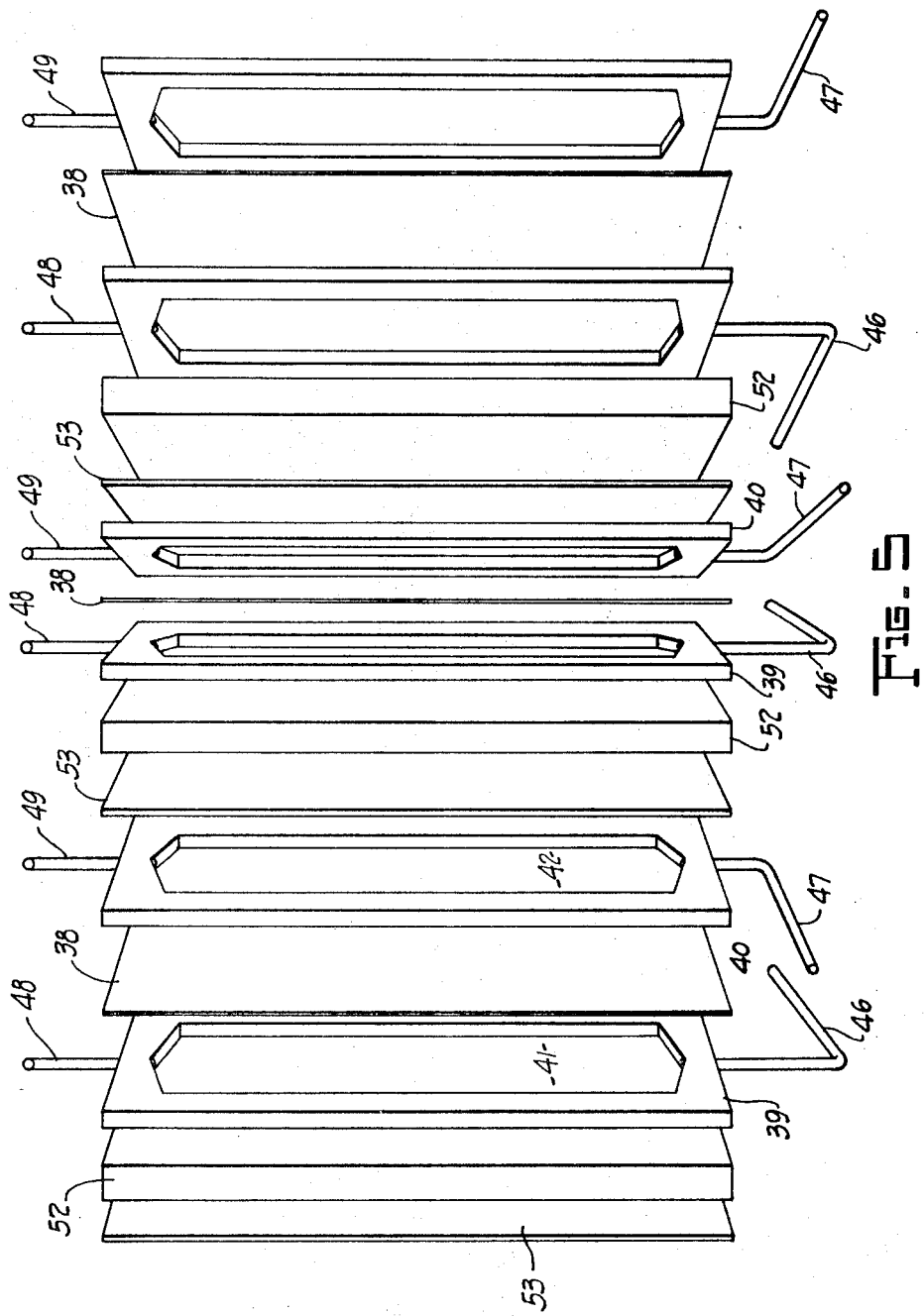

HYDRAZINE FUEL CELL AND PROCESS OF OPERATING SAID FUEL CELL

This invention relates generally to the direct conversion of one form of energy to another, and more particularly relates to an apparatus and method for accomplishing such direct conversion electrochemically. The principles of this invention, for exemplary purposes, will be described in reference to a fuel cell for directly converting chemical energy into electrical energy, it being understood, however, that these principles are applicable to other types of electrochemical reaction apparatus as well.

The direct conversion of chemical energy into electrical energy is accomplished by causing chemical reactions to take place between reactive materials at the junctures between spaced electron conductors and an intermediately disposed ion containing and conducting medium to form a continuous energy exchange system. The reactive materials are separately supplied to each juncture so that the charge exchange of the reaction takes place ionically through the ion conductor forming an internal circuit and electronically through the electron conductor forming an external circuit. Thus, where the reactive materials are continuously supplied and an electrical load is coupled to the external circuit it is possible to electrochemically convert the energy of chemical reaction directly into electrical energy in the external circuit.

By way of example, where hydrogen is employed as one of the materials and oxygen as the other, the oxidation and reduction of each of these materials at the corresponding juncture between the electronic and ionic conductors generates electrical energy in the external circuit and produces water as a product of reaction. When each of the materials is continuously supplied and consumed within such an apparatus, it may be likened, respectively, to a fuel, and to an antifuel, the former of which is selected to yield electrons in its chemical reaction and the latter of which is selected to accept electrons.

Normally, in any such apparatus, the fuel and the antifuel are supplied in a relatively stable condition and some means is required for activating their conversion from their normally stable reactant state to their reaction product state. It is believed that such conversion of the fuel and antifuel takes place by means of chemical adsorption to a chemisorbed state and desorption to their reaction product state at the corresponding junctures between the electron and ion conductors. Such conversion of the fuel and antifuel is not practically self-motivating and is therefore preferably enhanced by the introduction of some means which will promote adsorption at each juncture and some ionic means in the ion conducting medium which will promote desorption at each juncture. The reaction products may be removed from the apparatus in any convenient manner and preferably as they are formed.

For the purpose of this description the apparatus for accomplishing the direct conversion of chemical energy to electrical energy will be identified as a fuel cell. The electron conductors will be identified as electrodes and more specifically as the anode and cathode respectively depending upon whether they are on the fuel or antifuel side of the cell. The fuel will be identified throughout as any substance which is oxidizable relative to the antifuel which will in turn be identified as any substance which is reducible relative to the fuel; where oxidation and reduction, respectively, contemplate the release and acceptance of electrons. The ion conductor will be identified throughout as any medium which is capable of conducting an electrical charge associated with an atom or a group of atoms, i.e. ions, and which, therefore, electronically isolates the electronic conductors from each other in the internal circuit. The junctures between the electrodes and the ion conductor will be identified throughout as interfaces. The activating means for promoting the conversion of the fuel and antifuel from their reactant state through the chemisorbed state to the reaction product state will be more specifically identified in conjunction with their functional coaction in the cell as an adsorber and a desorber. This overall reaction will be referred to as an electrochemical reaction.

In accordance with this invention, there are provided improvements in the nature of the fuel and antifuel and in their activators respectively as well as improvements in the nature of the ion conductor and in the structural configuration of the cell and its component parts.

Heretofore, practical embodiments of fuel cells have contemplated employing fuels and antifuels in their gaseous states which necessitated structural safeguards and controls concomitant with the use of such materials in the gaseous state. These limitations are minimized and the flexibility of the cell enhanced in accordance with this invention by employing liquid solutions of the fuel and antifuel. Further, in accordance with this invention, advantage is taken of fuels and antifuels which can proceed towards their ultimate reaction products in a manner to optimumly utilize their electrical potentials.

Also in accordance with this invention practical recognition is accorded to the preferential ability exhibited by some activators for activating the fuel or the antifuel. This invention also concerns itself with the optimum selection and application of such preferential activators and with the provision of a compatible environment for same when they are by nature incompatible with each other, or with other components of the cell. Thus, more particularly, this invention is also concerned with the provision of a suitable barrier to isolate incompatible components from each other without otherwise adversely affecting the overall reaction or charge exchange in the internal circuit of the cell.

The aforesaid improvements in certain component parts and their functional coaction in a fuel cell also give rise to improvements in the structural configuration of such components as well as in their collective assembly. More particularly in accordance with this invention there is provided an improved cell structure which is physically chambered to receive the liquid fuel and antifuel on opposite sides of an ionically conducting barrier, the whole of which is compactly assembled and provided with suitable inlets and exhausts for the supply of the fuel and antifuel to the chambers and removal of their reaction products therefrom respectively.

In the drawings:

FIG. 5 is a fanned out view of the parts comprising a portion of the cell shown in FIG. 4.

Figure 1:
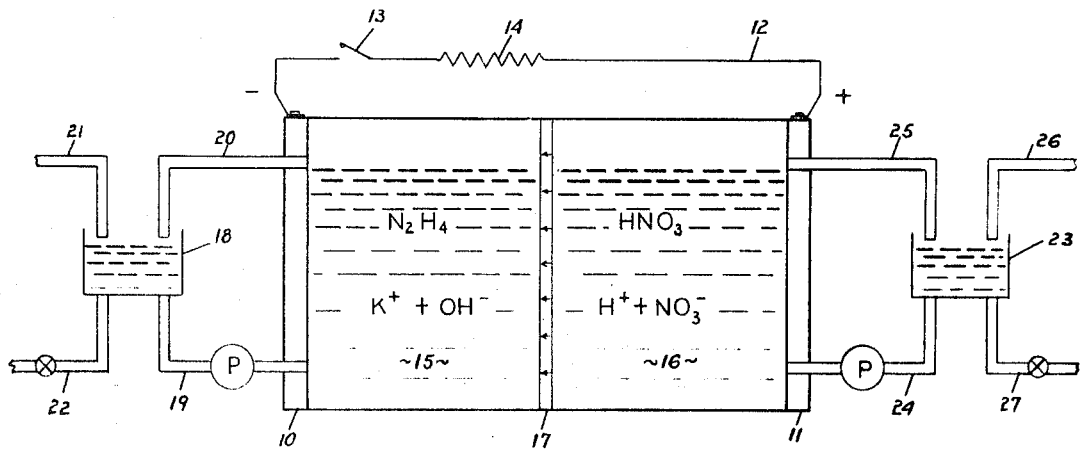
FIG. 1 is a diagrammatical illustration of a fuel cell embodying principles in accordance with this invention.

Referring now more particularly to the drawings, FIG. 1 shows in diagrammatic form a fuel cell of the liquid fuel and liquid antifuel type. Electrodes 10 and 11 may be connected to an external circuit 12 including a switch 13 and a load, such as, resistance 14, to form an electron conducting portion of the circuit. The internal circuit includes an ion containing and conducting medium which in the present case is composed of two liquid media, 15 and 16, respectively, separated by an ion permeable membrane 17. Liquid medium 15 on the left in FIG. 1 is an aqueous solution of a fuel, e.g. hydrazine; liquid medium 16, on the right is an aqueous solution of an antifuel, e.g. nitric acid. These materials, which would react violently if permitted to come into physical contact, are separated by the ion permeable barrier 17 which allows conductance of a current in the internal circuit ionically, but prevents physical intermixing of the fuel and antifuel.

When the switch 13 is closed and the electrochemical reactions take place at the interfaces of the electrodes 10 and 11 and the liquid media 15 and 16, respectively, the fuel and antifuel are consumed. For continuous operation, therefore, both these materials must be fed to the respective interfaces. Likewise, in such continuous operation, reaction products of the respective electrochemical reactions are produced and must be continuously removed, or exhausted.

Means are thus provided for feeding the liquid fuel and liquid antifuel, and removal of the respective reaction products. Continuing with the illustrative example there may be provided a make-up tank 18, connected to the cell by a conduit 19 having any suitable feeding means P, e.g. a pump. Exhaust means 20, e.g. an open conduit leading to the make-up tank 18, may be provided to permit escape of gaseous reaction products, e.g. nitrogen, and return of unused aqueous fuel solution. Fresh liquid fuel or fuel solution may be added as through a pipe 21 to adjust the concentration thereof to the desired point. Draw off of diluted fuel and reaction product water is provided through a drain 22.

Similar structure may be provided for the antifuel side of the cell where the antifuel is also a liquid. Thus a make-up tank 23, a conduit 24, pump P, exhaust means 25, pipe 26, and drain 27 may be provided.

In the preferred embodiment, activators are provided which coact to promote adsorption and desorption at the corresponding interfaces. On the fuel side, the adsorber is preferably in the nature of a noble metal such as platinum deposited on a steel substrate; whereas on the antifuel side enhanced adsorption is achieved by utilizing the enlarged surface of a porous inert material such as porous carbon or graphite. Where hydrazine is the fuel, an ionizable material, e.g. KOH may conveniently be used to promote desorption on the fuel side. An activator must also be provided in the ionic conducting medium to promote desorption of the chemisorbed reactant antifuel. Such material may be any water soluble acid other than nitric, or any water soluble easily dissociated salt, e.g. potassium nitrate. In the present structure, it is convenient to supply the activator in solution with the fuel or antifuel.

In a preferred embodiment utilizing a hydrazine/nitric acid system, it is preferably to employ as the ion conductive barrier 17 one which is preferably permselective to anions. This anion selectivity is indicated in FIG. 1 of the drawings by the direction of the arrows on the membrane 17.

Figure 2:
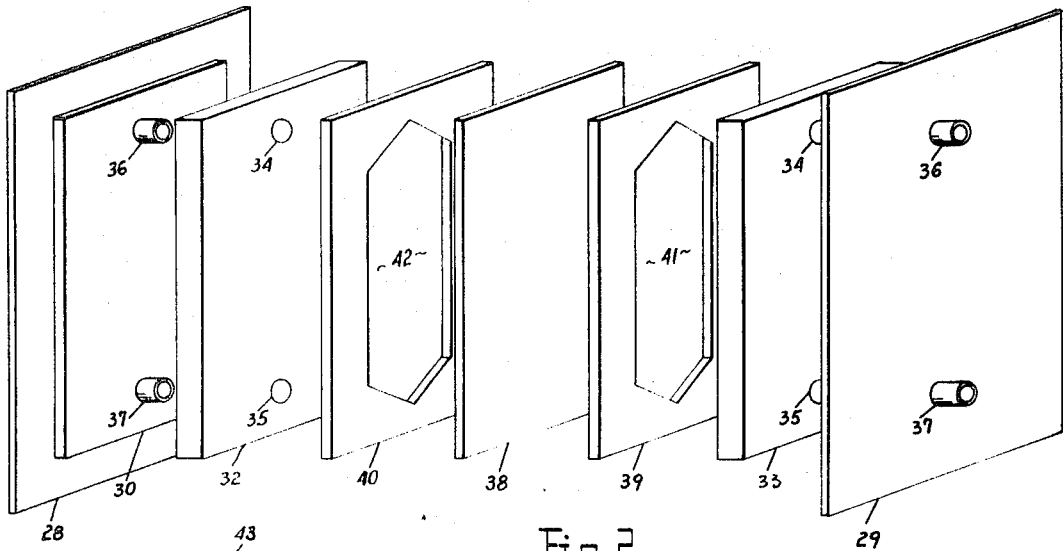
FIG. 2 is an exploded perspective view of a preferred form of the fuel cell constructed in accordance with this invention showing only the structural component parts thereof.
Figure 3:
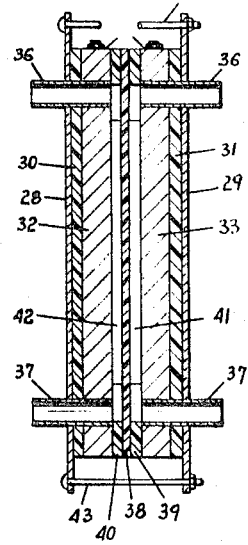
FIG. 3 is an elevational view of the physical structure of the fuel cell made in accordance with this invention in its assembled form.

FIGS. 2 and 3 show a preferred structural embodiment of a fuel cell made in accordance with the present invention; FIG. 2 showing the parts in exploded relation, FIG. 3 showing an end elevation of the parts in laminar relation.

A pair of steel end-plates 28 and 29 are provided, each having an electrically insulating member 30 and 31 of any suitable dielectric material, e.g. plastic, elastomers, or rubber disposed in laminar relation therewith. Planar electrodes 32 and 33 are provided and may be of any electronic conducting substance which as above indicated are steel and porous carbon for the fuel and antifuel sides respectively. Each electrode is provided with an outlet 34 and an inlet 35, each of which in the embodiment illustrated conveniently accommodates a chemically non-reactive, electrically non-conducting member, e.g. a polyethylene or nylon tube 36, 37, respectively, for outlet of fuel and antifuel reaction products, and inlet of fuel-activator aqueous solution and antifuel-activator aqueous solution, respectively. The tubes 36 and 37 appropriately extend through corresponding apertures in the electrodes and insulating members as shown. The nature of the electrode is dependent upon the particular fuel or antifuel employed, and may be metallic, graphite, metallized graphite or metal supported on an inert substrate.

Intermediate and spaced from the opposing surfaces of electrodes 32 and 33 is an ion permeable membrane 38 which acts as a barrier between the incompatible fuel and antifuel solutions, preventing molecular intermixing while permitting ionic transfer. With molecular mixing, the oxidizing and reducing agents react chemically and electrical energy is lost. These membranes may be of any suitable ion exchange resin. The variety of such membrane materials available is well known, and selection of desired permeability may be made. For example, a membrane selectively permeable to anions, or cations, or both may be selected. In the preferred embodiment, the membrane is an anion permeable ion exchange resin.

Typical examples of ion exchange resins of the type which may be used in accordance with the present invention are the following: The first is a "polyethylene membrane" available as "Amberplex C-1 cation exchange membrane." Such materials may be prepared by first polymerizing a mixture of about 95 parts by weight of styrene and about 5 parts by weight of divinyl benzene. The resulting polymer is comminuted to fine particles and 100 parts by weight of this finely divided material sulphonated by reaction with about 175 parts by weight of chlorosulphonic acid. This reaction is carried out by heating the mixture at reflux temperature for about 3 minutes and then maintaining the mixture at room temperature for an additional 50 hours. The sulphonated product is then treated with a large excess of water to destroy the excess of chlorosulphonic acid and any acid chlorides which are formed. This results in a sulphonated resin containing 3.1 milliequivalents of mobile hydrogen ions per gram of resin. After drying this sulphonated resin, 2 parts by weight of the dried resin are mixed with 1 part by weight of polyethylene and the resulting mixture pressed into sheet or membrane form. The resulting polyethylene membrane contains 2.1 milliequivalents of mobile hydrogen ions per gram of dry membrane. When the dried membrane is soaked in water, the resulting water solvated product contains about 45 percent by weight of water.

Another example of a resin may be prepared in accordance with the following:

| | |
|---|---|
| Sulfuric acid (95.5) | 141 parts |
| Phenol | 115 parts |
| Formaldehyde (37% in water) | 180 parts |

The sulfuric acid was added to the phenol at 95° C. and the mixture heated at 140° C. for 2 hours and cooled to room temperature. The formaldehyde was cooled to 0° C. and the mixture of phenol and sulfuric acid added, additional cooling being provided to keep the temperature of the mixture below 20° C. The temperature was then reduced to 5° C., at which temperature the mixture may be stored for weeks without polymerization. The mixture was a viscous, oily liquid of reddish amber color. This mixture may be heat polymerized by heating to a temperature of about 50° C. until the material is solid and dark in color. The solid material may be shaped to any desired shape such as by casting the liquid into a suitable form, solidifying and cutting off sections of desired thickness.

Marginally enclosing the spaces on either side of the membrane 38 are separating members 39 and 40 made of any suitable non-conducting material also non-reactive with the fuel and antifuel containing materials, respectively. Rubber or other elastomeric material, e.g. polyethylene may be used. The marginal walls of the separating members 39 and 40 in combination with the electrode surface and membrane surface in each side of the cell define an electrochemical reaction chamber 41 and 42 wherein the fuel and antifuel, respectively, undergo relative reduction and oxidation at the corresponding interfaces to produce electrical current in the external circuit.

It is convenient to shape the marginal walls at opposite ends of the chambers so as to converge to points to aid in converting the tubular flow of fluid from a tubular inlet 37 to a ribbon-like flow through the chamber and back to tubular flow into a tubular outlet 36 in each side of the cell.

The entire assembly may be combined in laminar relation as shown in FIG. 3, and being retained in such form by any suitable clamping means, such as bolts 43, to provide a very compact cell unit.

In operation the reactions occurring at the electrodes are not definitely known, but are believed to result in the following:

Anode interface: $N_2H_4 + 4\,OH^- \rightleftharpoons N_2 + 4\,H_2O + 4\,e^-$

Cathode interface: $2\,HNO_3 + 4\,H_2O + 10\,e^- \rightleftharpoons 10\,OH^- + N_2$ The overall chemical reaction can be one or both of the following:

$4\,HNO_3 + 5\,N_2H_4 \rightarrow 7\,N_2 + 12\,H_2O$ $2\,HNO_3 + 2\,N_2H_4 \rightarrow N_2O + 2\,N_2 + 5\,H_2O$ In a practical run of the preferred embodiment the absence of any red-brown fumes in the products was indicative of the absence of the formation of higher oxides of nitrogen. The effect of fuel concentration on current output was also investigated in a single cell unit. The dimensions of the electrodes and separating members were 4 × 6 inches and the chamber between the electrode and the membrane, was one-sixteenth inch in depth. The nitric acid, hydrazine and potassium hydroxide concentrations were compared at two levels at an open circuit EMF of approximately 2 volts and a working EMF (electromotive force) of 1.2 volts. The results obtained are shown in Table I. The data show that maximum current was obtained with 70 weight per cent aqueous nitric acid and a mixture of one part by volume of hydrazine and three parts by volume of 17.5 weight per cent potassium hydroxide solution. At these concentrations a short circuited amperage of 8.5 amperes and a working output of 6.2 amperes was obtained. The maximum short circuited amperage was calculated as 43 amps/sq. ft. of surface area, and the working cell amperage as 30 amps/sq. ft. Analysis of the results indicated the higher the concentration of nitric acid, the higher the amperage output of the cell.

TABLE I

| $N_2H_4$-KOH solution mixture, volume ratio | | KOH, wt. percent | $NHO_3$, percent conc. | Working amps | Flash amps |
|---|---|---|---|---|---|
| $N_2H_4$ | KOH | | | | |
| 1 | 3 | 17.5 | 35 | 1.5 | 3.2 |
| 1 | 3 | 17.5 | 70 | 6.2 | 8.5 |
| 1 | 3 | 35 | 35 | 1.2 | 2.4 |
| 1 | 3 | 35 | 70 | 2.6 | 5.2 |
| 1 | 1 | 17.5 | 35 | 1.3 | 2.3 |
| 1 | 1 | 17.5 | 70 | 6.6 | 7.4 |
| 1 | 1 | 35 | 35 | 1.0 | 2.4 |
| 1 | 1 | 35 | 70 | 3.5 | 5.9 |

Another study was conducted utilizing a stacked arrangement of 12 cell units connected in series. The electrodes were 11 inches square and the antifuel and fuel consisted of a 35 percent aqueous solution of nitric acid and equal volumes of 30 percent potassium hydroxide and hydrazine. The electrical output was sufficient to operate an outboard motor that normally requires an 18-volt auto battery as the power source.

Figure 4:
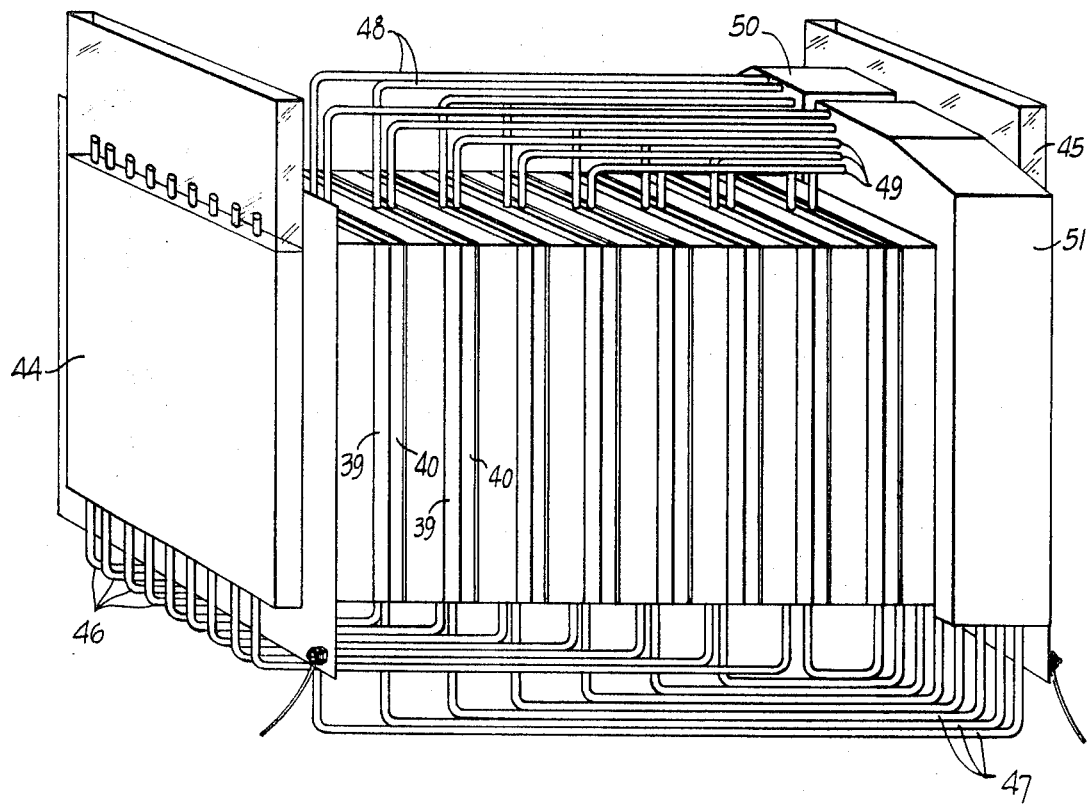
FIG. 4 is a perspective view of a parallel flow multi-cell unit.

FIGS. 4 and 5 show a series connected parallel flow multicell unit, FIG. 5 fanning out a portion to better illustrate internal details. In FIG. 4 there are shown a pair of feed headers 44 and 45 of similar construction for distributing fuel and antifuel, respectively. Feeder tubes 46 conduct fuel to the fuel reaction chambers 41 within the separating members 39. Feeder tubes 47 conduct antifuel to the antifuel reaction chambers 42 within the separating members 40. After undergoing the electrochemical reactions characteristic of the fuel, the products of such reaction are exhausted through exhaust lines 48; after undergoing the electrochemical reactions characteristic of the antifuel, the products of such reaction are exhausted through exhaust lines 49. Exhaust lines 48 and 49 lead to collectors 50 and 51, respectively, where the effluents may be collected separately for recovery of unreacted components, recovery of conversion products, or disposal, as may be desired. Chambers 41 and 42 are separated by a membrane 38, and this composite is flanked on either side by a graphite electrode 52, and a steel electrode 53, respectively. The steel electrodes 52 are, in turn, in laminar relation within the fuel cell unit composed of a graphite electrode 52, separator 39, membrane 38, separator member 40 and steel electrode 53. This assembly provides series connection electrically, and permits superimposition of individual voltages from each of the cell units. The structure shown in FIGS. 4 and 5 operates in the same manner as that shown in FIG. 3, with the exception that a plurality of such units are connected electrically in series, and supplied with fuel and antifuel, respectively, in parallel feeding relationship.

Antifuels that may be used include: nitrogen tetroxide, various perchlorates, chlorates and permanganates, liquid oxygen, hydrogen peroxide, fluorine, and other halides including mixed halides, vanadates, selanates and peroxy compounds. Possible fuels are hydroxyl amine, metal hydrides, various sulfites and hyposulfites, organic reducing agents, e.g. formaldehyde, glyoxal, metal alkyls, and even slurries and suspensions such as sodium, magnesium or aluminum in non-reactive but ion conducting media. It is contemplated that organic and inorganic ion conducting media, such as borohydrides and carbonyl compounds may be employed as well as aqueous systems. Additional salts, alkalies or acids may be present to render the electrolytes electrically conducting.

The improvements in the nature of the fuel and antifuel and in the activators as well as in the ion conductor and in their functional coaction in the improved structural environment provide for optimum conversion of chemical energy to electrical energy in a manner which establishes the practical utility of a fuel cell as a highly efficient electrical generator.

We have shown and described what we consider to be the preferred embodiments of our invention along with suggestions of modified forms, and it will be obvious to those skilled in the art that other changes and modifications can be made without departing from the scope of our invention as defined by the appended claims.

We claim:

1. A process for conversion of chemical energy directly into electrical energy which comprises the steps of supplying an aqueous solution of hydrazine to the interface between an anode and an aqueous electrolyte in a fuel cell, supplying an oxidizing agent to the interface between a cathode and an aqueous electrolyte in said fuel cell said anode and cathode being ionically connected, and electrically connecting said anode and cathode through an electrical load.

2. A process for conversion of chemical energy directly into electrical energy which comprises the steps of supplying an aqueous solution of hydrazine as a fuel to the interface between an anode and an electrolyte in a fuel cell, supplying an anti-fuel to the interface between a cathode and the electrolyte in said fuel cell, said anti-fuel being reducible relative to said hydrazine, said anode and cathode being ionically connected, and electrically connecting said anode and cathode through an electrical load.

3. A process for conversion of chemical energy directly into electrical energy which comprises the steps of supplying an aqueous solution of hydrazine to the interface between an anode and an aqueous electrolyte in a fuel cell, supplying an aqueous solution of a perchlorate to the interface between a cathode and an aqueous electrolyte in said fuel cell, said anode and cathode being ionically connected, and electrically connecting said anode and cathode through an electrical load.

4. A process for conversion of chemical energy directly into electrical energy which comprises the steps of supplying an aqueous alkaline solution of hydrazine to the interface between an anode and an aqueous electrolyte in a fuel cell, supplying an oxidizing agent to the interface between a cathode and an aqueous electrolyte in said fuel cell, said anode and cathode being ionically connected, and electrically connecting said anode and cathode through an electrical load.

5. A process for conversion of chemical energy directly into electrical energy which comprises the steps of supplying an aqueous solution of hydrazine to the interface between an anode and an aqueous electrolyte in a fuel cell, supplying an aqueous solution of nitric acid to the interface between a cathode and an aqueous electrolyte in said fuel cell said anode and cathode being ionically connected, and electrically connecting said anode and cathode through an electrical load.

6. A process for the conversion of chemical energy directly into electrical energy which comprises the steps of supplying an aqueous solution of hydrazine to the interface between an anode and an aqueous electrolyte in a fuel cell, supplying an aqueous solution of hydrogen peroxide to the interface between a cathode and an aqueous electrolyte in a fuel cell said anode and cathode being ionically connected, and electrically connecting said anode and cathode through an electrical load.

7. A process for conversion of chemical energy directly into electrical energy which comprises the steps of supplying an aqueous solution of hydrazine to the interface between an anode and an aqueous electrolyte in a fuel cell, supplying an aqueous solution of a permanganate to the interface between a cathode and an aqueous electrolyte in said fuel cell, said anode and cathode being ionically connected, and electrically connecting said anode and cathode through an electrical load.

8. A fuel cell for the electrochemical interaction of hydrazine in an aqueous solution of hydrazine and an alkali hydroxide with nitric acid in an aqueous solution of nitric acid, to produce electrical energy comprising in combination, a housing, a pair of non-reactive electrodes disposed in spaced relation in said housing, an ion permeable barrier, substantially impervious to liquid disposed in the housing between said pair of electrodes and in spaced relation therefrom, respectively to define separate chambers, said aqueous solution of hydrazine and alkali hydroxide being disposed in one of said chambers and forming a liquid-solid interface with the adjacent electrode in said chamber, and said aqueous solution of nitric acid disposed in the other of said chambers and forming a liquid-solid interface with the adjacent electrode in said other chamber, ions contained in each solution in each of said chambers respectively adapted to promote desorption of ions derived from said hydrazine in one chamber, and desorption of ions derived from said nitric acid in the other chamber, means for supplying said aqueous solution of hydrazine and alkali hydroxide to said one chamber, and means for supplying said aqueous solution of nitric acid to the other of said chambers, means for externally connecting the electrodes across a load through an electron conductor to form an external circuit therefore, said hydrazine and said nitric acid adapted to coact electrochemically when said external circuit is closed to convert the energy of reaction into electrical energy, and means for removing the reaction product from the cell.

9. In a fuel cell, an aqueous solution of hydrazine and potassium hydroxide in one chamber and an aqueous solution of nitric acid disposed in a separate chamber isolated from said first chamber by an ion-permeable barrier, each of said chambers including a separate electrode and forming a liquid-solid interface with the aqueous solution contained in said chamber, respectively, whereby said hydrazine and said nitric acid are disposed for electrochemical coaction at the liquid-solid interfaces formed at said separate electrodes, respectively, one of said electrodes comprising a metallic substrate and a platinum black coating applied at its liquid-solid interface and coacting therewith to promote adsorption.

10. The fuel cell of claim 9 wherein the ion-permeable barrier is substantially impervious to the aqueous hydrazine solution and to the aqueous nitric acid solution, and selectively permeable to one of the species of hydroxyl ions and hydrogen ions.

* * * * *